US009624940B2

(12) United States Patent
Jones et al.

(10) Patent No.: US 9,624,940 B2
(45) Date of Patent: Apr. 18, 2017

(54) ROTOR ASSEMBLY

(75) Inventors: David Michael Jones, Malmesbury (GB); Richard Iain Mockridge, Malmesbury (GB); Geoffrey Michael Burlington, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 459 days.

(21) Appl. No.: 12/709,880

(22) Filed: Feb. 22, 2010

(65) Prior Publication Data

US 2010/0215500 A1 Aug. 26, 2010

(30) Foreign Application Priority Data

Feb. 24, 2009 (GB) .................... 0903052.9

(51) Int. Cl.
F04D 29/056 (2006.01)
F04D 29/26 (2006.01)
F16C 19/54 (2006.01)
F16C 25/08 (2006.01)

(52) U.S. Cl.
CPC ....... F04D 29/0563 (2013.01); F04D 29/263 (2013.01); F16C 19/54 (2013.01); F16C 25/083 (2013.01); F16C 2360/00 (2013.01)

(58) Field of Classification Search
CPC .... F04D 29/0563; F04D 29/263; F16C 19/54; F16C 25/083; F16C 2360/00
USPC .......... 416/174, 244 A; 415/232, 216.1, 229, 415/142
See application file for complete search history.

(56) References Cited

U.S. PATENT DOCUMENTS

| 2,107,090 | A | * | 2/1938 | Swennes | 415/70 |
| 2,113,167 | A | * | 4/1938 | Baumheckel | 384/139 |
| 2,235,763 | A | * | 3/1941 | Horton | 415/231 |
| 2,908,536 | A | | 10/1959 | Dickey | |
| 2,911,138 | A | * | 11/1959 | Birmann | 417/369 |
| 2,939,626 | A | * | 6/1960 | Birmann | 416/171 |
| 2,940,658 | A | * | 6/1960 | Birmann | 416/135 |
| 3,068,638 | A | * | 12/1962 | Birmann | 60/605.1 |
| 3,759,592 | A | | 9/1973 | Carlson | |
| 4,147,470 | A | * | 4/1979 | Brooks et al. | 416/95 |
| 4,426,089 | A | | 1/1984 | Takenaka et al. | |
| 4,514,140 | A | | 4/1985 | Knopf | |
| 4,652,219 | A | | 3/1987 | McEachern, Jr. et al. | |
| 4,806,075 | A | | 2/1989 | Osterstrom et al. | |
| 4,907,897 | A | | 3/1990 | Shirotori | |

(Continued)

FOREIGN PATENT DOCUMENTS

DE 10221443 12/2003
EP 1025792 8/2000

(Continued)

OTHER PUBLICATIONS

GB Search Report dated Jun. 11, 2009, directed at counterpart GB Application No. 0903052.9; 2 pages.

(Continued)

*Primary Examiner* — Richard Edgar
(74) *Attorney, Agent, or Firm* — Morrison & Foerster LLP

(57) ABSTRACT

A rotor assembly that includes a shaft to which are mounted an impeller and a bearing assembly. The bearing assembly is located at least partly within the profile of the impeller so as to reduce loading of the bearing assembly as well as reduce the cantilever length of the rotor assembly.

5 Claims, 3 Drawing Sheets

(56) References Cited

U.S. PATENT DOCUMENTS

| | | | |
|---|---|---|---|
| 5,069,603 A | 12/1991 | Schuetz et al. | |
| 5,163,811 A | 11/1992 | Okada | |
| 5,289,067 A | 2/1994 | Tanaka et al. | |
| 5,520,008 A * | 5/1996 | Ophir et al. | 62/268 |
| 5,961,222 A | 10/1999 | Yabe et al. | |
| 6,246,137 B1 | 6/2001 | Obara | |
| 6,271,612 B1 | 8/2001 | Tanaka et al. | |
| 6,368,081 B1 | 4/2002 | Matsumoto | |
| 6,547,538 B1 | 4/2003 | Tamura et al. | |
| 6,652,246 B1 * | 11/2003 | Lin et al. | F04D 29/582 417/360 |
| 6,717,308 B2 | 4/2004 | Chen et al. | |
| 7,077,626 B2 | 7/2006 | Bosen | |
| 7,125,172 B2 | 10/2006 | Ostling et al. | |
| 7,207,774 B2 * | 4/2007 | Kashiwazaki et al. | F04D 29/4226 415/203 |
| 7,384,247 B2 | 6/2008 | Anderson | |
| 7,416,344 B2 | 8/2008 | Yamamoto et al. | |
| 2004/0200215 A1 | 10/2004 | Woollenweber et al. | |
| 2005/0207888 A1 * | 9/2005 | Kashiwazaki et al. | 415/206 |
| 2005/0207919 A1 | 9/2005 | Anderson | |
| 2006/0023981 A1 | 2/2006 | Okayama | |
| 2006/0131973 A1 | 6/2006 | Chiu et al. | |
| 2008/0087018 A1 | 4/2008 | Woollenweber | |
| 2008/0237195 A1 * | 10/2008 | Iwasa et al. | 219/61 |
| 2008/0304986 A1 | 12/2008 | Kenyon et al. | |
| 2009/0081040 A1 | 3/2009 | Ueno et al. | |
| 2009/0155055 A1 * | 6/2009 | Chu | 415/142 |
| 2010/0148600 A1 | 6/2010 | Bauer et al. | |
| 2010/0215491 A1 | 8/2010 | Mockridge et al. | |
| 2013/0223997 A1 | 8/2013 | Childe et al. | |

FOREIGN PATENT DOCUMENTS

| | | | |
|---|---|---|---|
| EP | 1557578 | | 7/2005 |
| EP | 2 000 675 | | 12/2008 |
| FR | 2207247 | | 6/1974 |
| FR | 2393175 | | 12/1978 |
| FR | 2 483 024 | | 11/1981 |
| FR | 2 569 771 | | 3/1986 |
| GB | 788378 | * | 1/1958 ............. F04C 19/00 |
| GB | 1305166 | | 1/1973 |
| GB | 2175957 | | 12/1986 |
| GB | 2406146 | | 3/2005 |
| GB | 2442475 | | 4/2008 |
| JP | 59-97557 | | 7/1984 |
| JP | 62-117297 | | 7/1987 |
| JP | 63-9428 | | 1/1988 |
| JP | 1-242024 | | 9/1989 |
| JP | 3-85394 | | 4/1991 |
| JP | 4-3120 | | 1/1992 |
| JP | 5-87290 | | 11/1993 |
| JP | 6-66318 | | 3/1994 |
| JP | 2000-208078 | | 7/2000 |
| JP | 2001-73948 | | 3/2001 |
| JP | 2001-303964 | | 10/2001 |
| JP | 2002-31133 | | 1/2002 |
| JP | 2003-97576 | | 4/2003 |
| JP | 2004-278538 | | 10/2004 |
| JP | 2004-316505 | | 11/2004 |
| JP | 2007-506053 | | 3/2007 |
| JP | 2008-92629 | | 4/2008 |
| JP | 2008-144724 | | 6/2008 |
| JP | 2009-79628 | | 4/2009 |
| JP | 2011-106338 | | 6/2011 |
| WO | WO-03/027523 | | 4/2003 |
| WO | WO-2007/021838 | | 2/2007 |
| WO | WO-2008/026876 | | 3/2008 |

OTHER PUBLICATIONS

International Search Report and Written Opinion mailed on May 4, 2010, directed towards corresponding International Application No. PCT/GB2010/050210; 10 pages.

Muszynska, Agnieszka. Rotordynamics. Boca Raton: Taylor & Francis, 2005. Print. p. 460.

Mockridge et al., U.S. Office Action mailed Sep. 13, 2012, directed to U.S. Appl. No. 12/707,504; 14 pages.

Mockridge et al., U.S. Office Action mailed Feb. 26, 2013, directed to U.S. Appl. No. 12/707,504; 12 pages.

Mockridge et al., U.S. Office Action mailed Jun. 25, 2013, directed to U.S. Appl. No. 12/707,504; 8 pages.

Mockridge et al., U.S. Office Action mailed Nov. 7, 2013, directed to U.S. Appl. No. 12/707,504; 9 pages.

Childe et al., U.S. Office Action mailed Mar. 28, 2014, directed to U.S. Appl. No. 13/589,947; 8 pages.

* cited by examiner

ROTOR ASSEMBLY

REFERENCE TO RELATED APPLICATIONS

This application claims the priority of United Kingdom Application No. 0903052.9, filed Feb. 24, 2009, the entire contents of which are incorporated herein by reference.

FIELD OF THE INVENTION

The present invention relates to a rotor assembly for a compressor.

BACKGROUND OF THE INVENTION

The rotor assembly of a compressor typically comprises an impeller mounted to a shaft that is driven by a motor. Imbalance in the rotor assembly places increased loading on the bearings used to mount the rotor assembly within the compressor, thereby reducing the lifespan of the bearings. The rotor assembly is therefore ideally balanced prior to mounting within the compressor. However, it is not always possible to balance the rotor assembly as a complete unit prior to mounting within the compressor. Instead, it is often necessary to assemble the various components of the rotor assembly within the compressor. Accordingly, while the individual components may be balanced, the completed rotor assembly may not be. Moreover, even when it proves possible to dynamically balance the rotor assembly, imbalance often subsequently arises as a result of component wear and thermal distortion.

SUMMARY OF THE INVENTION

In a first aspect, the present invention provides a rotor assembly comprising a shaft to which are mounted an impeller and a bearing assembly, wherein the bearing assembly is located at least partly within the profile of the impeller and comprises a pair of spaced bearings surrounded by a sleeve.

The profile of the impeller is bounded axially by those ends or points of the impeller that extend furthest in the axial direction. Accordingly, the profile of the impeller may be bounded by the hub, the blades and/or the shroud of the impeller.

By having a bearing assembly that is located at least partly within the profile of the impeller, loading of the bearing assembly due to impeller imbalance is significantly reduced. Consequently, the lifespan of the bearing assembly is prolonged. Additionally, by locating the bearing assembly within the profile of the impeller, the cantilever length of the rotor assembly is reduced. This then increases the stiffness of the rotor assembly, which in turn results in a higher first flexural natural frequency. Consequently, the rotor assembly is able to operate at much higher sub-critical speeds.

In having a bearing assembly that comprises a pair of spaced bearings surrounded by a common sleeve, a first portion of the bearing assembly may be located inside the impeller profile while a second portion may be located outside the impeller profile. The portion located outside of the impeller may then be secured to a frame, housing or the like. Consequently, the rotor assembly may be secured to a frame or housing over a relatively large surface area, thus ensuring good securement. Moreover, in having a pair of spaced bearings, the bearing assembly provides a good, stable support for the rotor assembly.

Preferably, the bearing assembly is located at least partly within a recess in the impeller. More preferably, an end of the impeller is spaced radially from the shaft to define the recess in the impeller.

The impeller ideally comprises a hub supporting a plurality of blades and a recess is formed in an end of the hub. The end of the hub is thus spaced radially from the shaft. The bearing assembly is then located at least partly within the recess. The centre-of-mass of the impeller is typically located between the two axial ends of the hub. By locating the bearing assembly within a recess in the hub, the bearing assembly may be located closer to the centre-of-mass of the impeller. Consequently, the cantilever length of the rotor assembly, as well as radial loading arising from impeller imbalance, may be reduced.

Advantageously, the hub comprises a bore into which the shaft is received and the recess in the end of the hub is greater in diameter than that of the bore. While the recess is greater in diameter than that of the bore, it is not necessary that the recess has a circular cross-section. Instead, the recess need only extend beyond the diameter of the bore.

The recess in the end of the hub may be formed in different ways. For example, the hub may include a domed wall having a concave inner surface such that a recess is defined in the bottom of the hub; the bottom end of the hub is then spaced from the shaft. By way of further example, the hub may include an annular recess in the top of the hub; the top end of the hub is then spaced from the shaft.

The bearing assembly may overlie the centre-of-mass of the impeller. This then has the advantage that radial loading due to subsequent imbalance in the impeller may be kept to a minimum.

The bearing assembly may comprise a bearing that is located wholly within the profile of the impeller. In so doing, the bearing may then overlie or at least be located closer to the centre-of-mass of the impeller.

In a second aspect, the present invention provides a rotor assembly comprising a shaft to which are mounted an impeller and a bearing assembly, wherein the impeller comprises a hub supporting a plurality of blades and a recess formed in a top end of the hub, and the bearing assembly is located at least partly within the recess.

By locating the bearing assembly at least partly within a recess in the top of the impeller, the bearing assembly is located closer to the centre-of-mass of the impeller. Consequently, loading of the bearing assembly due to impeller imbalance is reduced and the lifespan of the bearing assembly is increased. Additionally, the cantilever length of the rotor assembly is reduced thus increasing the stiffness of the rotor assembly, which in turn enables the rotor assembly to operate at higher sub-critical speeds.

The bearing assembly may comprise a bearing that is located wholly within the profile of the impeller. In so doing, the bearing may then be located closer to the centre-of-mass of the impeller.

Preferably, the hub is spaced radially from the bearing assembly, i.e. a clearance exists between the hub and bearing assembly. Consequently, the impeller is free to rotate relative to the outer surface of the bearing assembly.

The bearing assembly may comprise one or more bearings. Advantageously, the bearing assembly takes the form of a bearing cartridge that comprises a pair of spaced bearings surrounded by a common sleeve. As already noted, this then has the advantage that a first portion of the bearing assembly may be located inside the impeller profile while a second portion may be located outside the impeller profile. The portion located outside of the impeller may then be secured to a frame, housing or the like. Additionally, in having a pair of spaced bearings, the bearing assembly provides a good, stable support for the rotor assembly.

The impeller may be a semi-open or closed impeller. In particular, the impeller may include a shroud, with the plurality of blades then extending between the hub and the shroud.

In a third aspect, the present invention provides a rotor assembly comprising a shaft to which are mounted an impeller and a bearing assembly, wherein the impeller comprises a hub supporting a plurality of blades and a recess formed in a top end of the hub, the bearing assembly is located at least partly within the recess and comprises a pair of spaced bearings surrounded by a common sleeve, and the hub is spaced radially from the bearing assembly such that the impeller is free to rotate relative to the sleeve.

BRIEF DESCRIPTION OF THE DRAWINGS

In order that the present invention may be more readily understood, embodiments of the invention will now be described, by way of example, with reference to the accompanying drawing, in which.

DETAILED DESCRIPTION OF THE INVENTION

Figure 1:
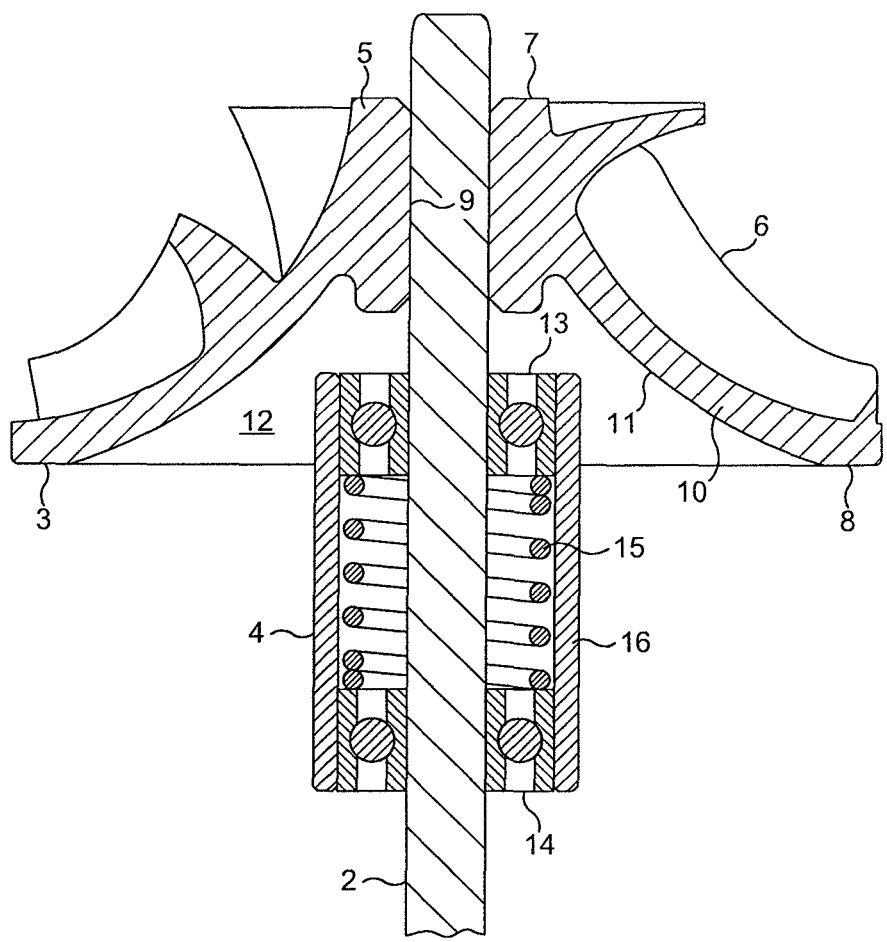
FIG. 1 is a sectional view of a rotor assembly in accordance the present invention.

The rotor assembly 1 comprises a shaft 2 to which are mounted an impeller 3 and a bearing cartridge 4.

The impeller 3 comprises a hub 5 around which a plurality of blades 6 are supported. The hub 5 extends axially from a top end 7 to a bottom end 8. A central bore 9 extends through the hub 5 into which the shaft 2 is received. The hub 5 includes a dome-shaped wall 10 having a concave inner surface 11 that defines a central recess 12 in the bottom 8 of the hub 5. The recess 12 is greater in diameter than that of the bore 9 such that the bottom end 8 of the hub 5 is spaced radially from the shaft 2.

The bearing cartridge 4 comprises a pair of spaced bearings 13,14 preloaded by a spring 15 and surrounded by a sleeve 16. The bearing cartridge 4 is mounted to the shaft 2 such that the bearing cartridge 4 projects into the recess 12 formed in the bottom 8 of the hub 5. The bearing cartridge 4 is thus partly located within the profile of the impeller 3, i.e. the region bounded between the top 7 and bottom 8 of the hub 5.

The bearing cartridge 4 provides means by which the rotor assembly 1 may be mounted to a frame, housing or the like. Since the recess 12 formed in the hub 5 is relatively large, the frame may extend into the recess 12 such that the bearing cartridge 4 is secured along its entire length. However, it is not essential that the bearing cartridge 4 is secured along its entire length and the bearing cartridge 4 might equally be secured over a portion only, e.g. the portion of the bearing cartridge 4 that is not located within the impeller profile. The provision of a bearing cartridge 4 has the advantage of presenting a relatively large surface area, namely the sleeve 16, over which the bearing cartridge 4 may be secured to the frame. Consequently, a good securement may be formed between the rotor assembly 1 and the frame. Moreover, in having a pair of spaced bearings 13,14, the bearing assembly 4 provides a good, stable support for the rotor assembly 1.

Owing to its relatively large diameter, any imbalance in the impeller 3 may cause a relatively large moment of force to act on the shaft 2 when the rotor assembly 1 is rotating at speed. The bearing cartridge 4, and in particular the bearing 13 proximate the impeller 3, must then oppose this moment of force in order to maintain the position of the shaft 2.

By locating the bearing cartridge 4 at least partly within the profile of the impeller 3, the distance between the bearing 13 and the centre-of-mass of the impeller is reduced. Consequently, any imbalance in the impeller 3, which causes the centre-of-mass of the impeller 3 to shift from the rotational axis, results in a much smaller moment of force and thus radial loading of the bearing 13 is significantly reduced.

Additionally, locating the bearing cartridge 4 within the profile of the impeller 3 reduces the cantilever length of the rotor assembly 1. This then increases the stiffness of the rotor assembly 1, which in turn results in a higher first flexural natural frequency. The rotor assembly 1 is therefore able to operate sub-critically (i.e. below the first natural frequency) at much higher speeds. By operating at sub-critical speeds, balancing of the rotor assembly 1 is made much simpler, as is management of the rotor assembly 1 during transient operation conditions (e.g. during acceleration and deceleration of the rotor assembly 1).

In the embodiment illustrated in FIG. 1, the centre-of-mass of the impeller 3 is located within the recess 12 in the bottom 8 of the hub 5. The bearing cartridge 4 projects into the recess 12 such that the bearing 13 overlies the centre-of-mass of the impeller 3. Consequently, radial loading due to subsequent impeller imbalance is kept to a minimum. For the particular design of impeller 3 illustrated in FIG. 1, the centre-of-mass of the impeller 3 is proximate the bottom 8 of the hub 5. It is for this reason that the bearing 13 is located only partly within the impeller profile. Should the centre-of-mass of the impeller 3 be located further inside the hub 5, the bearing cartridge 4 may project further into the impeller 3. Indeed, the bearing cartridge 4 may project into the recess 12 in the hub 5 such that the bearing 13 is located wholly within impeller profile.

Figure 2:
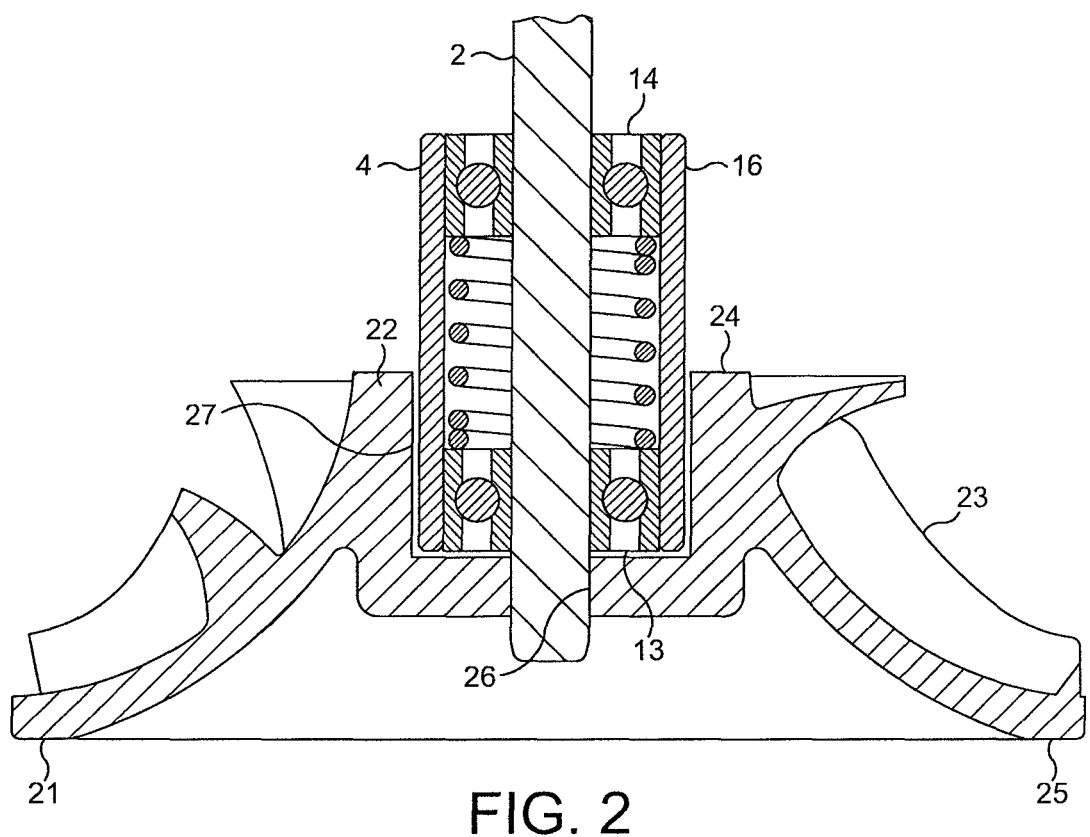
FIG. 2 is a sectional view of an alternative rotor assembly in accordance with the present invention.

FIG. 2 illustrates an alternative rotor assembly 20 comprising a shaft 2 to which are mounted an impeller 21 and a bearing cartridge 4. The shaft 2 and bearing cartridge 4 are unchanged from the embodiment described above and illustrated in FIG. 1.

The impeller 21 comprises a hub 22 around which a plurality of blades 23 are supported. The hub 22 extends axially from a top end 24 to a bottom end 25. A central bore 26 extends through the hub 5 into which the shaft 2 is received. A central, annular recess 27 is formed in the top end 24 of the hub 22. The recess 27 is greater in diameter than that of the bore 26 such that the top end 24 of the hub 22 is spaced radially from the shaft 2.

The bearing cartridge 4 projects into the recess 27 in the top 24 of the hub 22. The bearing cartridge 4 is thus partly located within the profile of the impeller 21, i.e. the region bounded by the top 24 and bottom 25 of the hub 22. A clearance exists between the bearing cartridge 4 and the hub 22 such that the impeller 3 is free to rotate relative to the sleeve 16 of the bearing cartridge 4.

The portion of the bearing cartridge 4 that does not project into the recess 27 of the hub 22 is available for securing to a frame, housing or like. It is not necessary that the frame be secured along the full length of the bearing cartridge 4 since the sleeve 14 acts as an extension of the frame. Nevertheless, should one wish to secure the frame along the full length of the bearing cartridge 4, the recess 27 in the top 24 of the hub 22 may be increased in size such that the frame may also project into the recess 27.

Again, since the bearing cartridge 4 is located at least partly within the profile of the impeller 21, the cantilever length of the rotor assembly 20 is shortened, resulting in a stiffer rotor assembly 20 of higher critical speed, and radial loading of the bearing 13 due to impeller imbalance is reduced. In the embodiment illustrated in FIG. 2, the centre-of-mass of the impeller 21 is again proximate the bottom 25 of the hub 22. However, owing to design requirements, the bearing cartridge 4 projects into top 24 rather than the bottom 25 of the hub 22. Accordingly, in order the bearing 13 is proximate the centre-of-mass of the impeller 21, the bearing cartridge 4 projects further into the impeller 21 than the embodiment illustrated in FIG. 1. Indeed, the bearing 13 of the bearing cartridge 4 is located wholly within the impeller profile.

Figure 3:
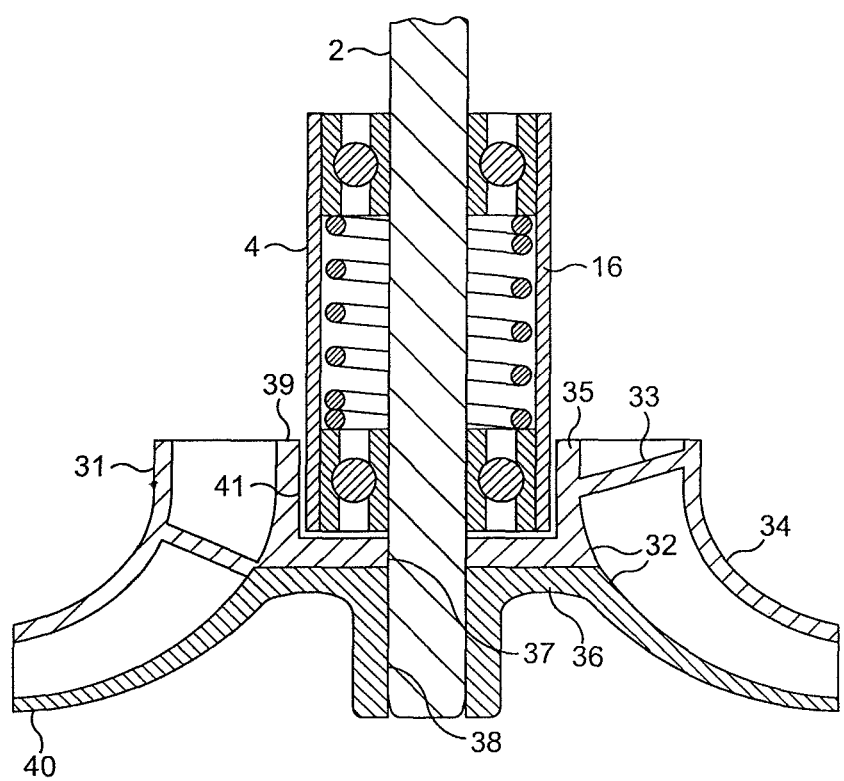
FIG. 3 is a sectional view of a further rotor assembly in accordance with the present invention.

FIG. 3 illustrates a further rotor assembly 30 comprising a shaft 2 to which are mounted an impeller 31 and a bearing cartridge 4. Again, the shaft 2 and bearing cartridge 4 are unchanged from the embodiments described above and illustrated in FIGS. 1 and 2.

The impeller 31 comprises a two-part hub 32, a plurality of blades 33 and a shroud 34. The blades 33 are attached to and extend between a first part 35 of the hub 32 and the shroud 34. Each part 35,36 of the hub 32 includes a central bore 37,38 into which the shaft 2 is received. The two parts 35,36 of the hub 32 are mounted to the shaft 2 such that the hub 32 extends axially from a top end 39 to a bottom end 40, and the blades 33 extend between the top and bottom ends 39,40 of the hub 32.

A central, annular recess 41 is formed in the top end 39 of the hub 32, i.e. the top 39 of the first part 35 of the hub 32. The recess 41 is greater in diameter than that of the bore 37 such that the top end 39 of the hub 32 is spaced radially from the shaft 2.

As with the embodiment described above with reference to FIG. 2, the bearing cartridge 4 projects into the recess 41 in the top 39 of the hub 32 such that the bearing cartridge 4 is partly located within the profile of the impeller 31, i.e. the region bounded between the top 39 and bottom 40 of the hub 32. A clearance exists between the bearing cartridge 4 and the hub 32 such that the impeller 31 is free to rotate relative to the sleeve 16 of the bearing cartridge 4.

In each of the embodiments described above, the profile of the impeller is bounded axially by the top and bottom of the hub. However, the profile of the impeller might equally be bounded by the shroud and/or the blades of the impeller. For example, if the lower part 36 of the hub 32 of the embodiment illustrated in FIG. 3 were omitted or was static relative to the remainder of the impeller 31, then the profile of the impeller 31 would be bounded axially at the top 37 by the hub 32 and at the bottom by the blades 33. The profile of the impeller is thus bounded axially by those ends or points of the impeller that extend furthest in the axial direction.

The rotor assembly of each of the above-described embodiments comprises a bearing cartridge 4 having a pair of spaced bearings 13,14 surrounded by a common sleeve 16. However, the rotor assembly might equally comprise an alternative type of bearing assembly. For example, the rotor assembly might comprise a double row bearing, a needle roller, or indeed a single ball bearing. Should it be necessary, the recess in the impeller may be sized so as to permit a frame or housing to also project into the recess such that the bearing assembly may be secured to the frame or housing.

The embodiments described above demonstrate that a bearing assembly may be partly located within a semi-open (FIGS. 1 and 2) or closed impeller (FIG. 3). Moreover, the bearing assembly may project into the top (FIGS. 2 and 3) or bottom (FIG. 1) of the impeller such that the rotor assembly can be secured to a frame or housing at a point above or below the impeller.

With the rotor assembly of the present invention, a bearing assembly is located at least partly with the profile of the impeller. Accordingly, any imbalance in the impeller results in a much smaller moment of force being applied to the shaft. Radial loading of the bearing assembly due to impeller imbalance is thus reduced and the lifespan of the bearing assembly is prolonged. Additionally, the cantilever length of the rotor assembly is shortened and thus a stiffer rotor assembly having a higher critical speed is realised.

The invention claimed is:

1. A rotor assembly for a centrifugal compressor comprising:
   a shaft to which are mounted a centrifugal impeller and a bearing assembly comprising:
   a pair of spaced bearings surrounded by a sleeve, wherein the centrifugal impeller comprises a hub supporting a plurality of blades,
   a recess is formed in a top end of the hub,
   a bore extends through the recess formed in the top end of the hub with the shaft being inserted through the bearing assembly and into the bore,
   the diameter of the recess is greater than that of the bore,
   the bearing assembly is located at least partly within the recess,
   wherein the hub is spaced radially from the bearing assembly, and wherein the shaft and the bearing assembly substantially fill the recess formed in the top end of the hub and present an annular gap between an outer diameter of the sleeve and an inner diameter of the recess.

2. The rotor assembly of claim 1, wherein the hub includes a concave inner surface that defines the recess in the top of the hub.

3. The rotor assembly of claim 1, wherein the bearing assembly is proximate the centre-of-mass of the impeller.

4. The rotor assembly of claim 1, wherein the bearing assembly comprises one of the pair of spaced bearings located wholly within the recess.

5. The rotor assembly of claim 1, wherein the impeller comprises a shroud and the plurality of blades extend between the hub and the shroud.

* * * * *